(12) United States Patent
Spear

(10) Patent No.: US 6,192,037 B1
(45) Date of Patent: Feb. 20, 2001

(54) METHOD FOR CHANGING COMMUNICATION IN A COMMUNICATION SYSTEM, AND COMMUNICATION SYSTEM THEREFOR

(75) Inventor: Stephen Lee Spear, Skokie, IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/315,277

(22) Filed: May 20, 1999

(51) Int. Cl.$^7$ .................................................. H04Q 11/00
(52) U.S. Cl. ........................ 370/315; 370/329; 370/341; 370/351; 455/422; 455/436; 455/442
(58) Field of Search .................................... 370/315, 316, 370/324, 328, 331, 332, 335, 342, 351, 354, 227, 228, 329, 341; 455/421, 422, 436, 442

(56) References Cited

U.S. PATENT DOCUMENTS

| | | | |
|---|---|---|---|
| 5,661,724 | * | 8/1997 | Chennakeshu et al. ............. 370/324 |
| 5,761,619 | * | 6/1998 | Danne et al. ......................... 455/436 |
| 5,956,641 | * | 9/1999 | Bruckert et al. ..................... 455/442 |
| 6,049,535 | * | 4/2000 | Ozukturk et al. .................... 370/335 |
| 6,061,565 | * | 5/2000 | Innes et al. .......................... 455/436 |

* cited by examiner

*Primary Examiner*—Douglas Olms
*Assistant Examiner*—Shick Hom
(74) *Attorney, Agent, or Firm*—John B. MacIntyre; Kenneth A. Haas

(57) ABSTRACT

The present invention provides a method for changing communication in a communication system (100). The communication system (100) includes a base station subsystem (102) and a mobile switching center (120). The base station subsystem (102) includes a first transcoder (108) and a second transcoder (109) connected to the mobile switching center (120), a first base station controller (106) connected to a first transcoder (108), a second base station controller (107) connected to a second transcoder (109), and a base transceiver station (104) connected to the first base station controller (106) and the second base station controller (107). A communication is established between a mobile station and the mobile switching center (120). The communication travels to the mobile switching center (120) via a first link (110) that includes the first base station controller (106). If the first link (110) is no longer the preferred link, the communication is changed to a second link (112) that includes the second base station controller (107).

18 Claims, 1 Drawing Sheet

METHOD FOR CHANGING COMMUNICATION IN A COMMUNICATION SYSTEM, AND COMMUNICATION SYSTEM THEREFOR

RELATED APPLICATIONS

The following applications are related to this application and are filed on the date herewith. The disclosure of each of these related applications is incorporated by reference: Ser. No. 09/315,309 titled "SESSION BASED BILLING IN A COMMUNICATION SYSTEM"; Ser. No. 09/315,696 titled "METHOD FOR ESTABLISHING COMMUNICATION IN A PACKET NETWORK"; Ser. No. 09/315,908 titled "METHOD FOR RETRANSMITTING A DATA PACKET IN A PACKET NETWORK"; Ser. No. 09/315,314 titled "COMMUNICATION NETWORK METHOD AND APPARATUS"; Ser. No. 09/315,467 titled "METHOD AND SYSTEM FOR PROCESSING INTELLIGENT NETWORK COMMANDS IN A COMMUNICATIONS NETWORK"; Ser. No. 09/315,653 titled "METHOD AND SYSTEM FOR NETWORK SERVICE NEGOTIATION IN A TELECOMMUNICATIONS SYSTEM"; Ser. No. 09/315,465 titled "METHOD AND APPARATUS FOR ROUTING PACKET DATA IN A COMMUNICATIONS SYSTEM"; Ser. No. 09/315,466 titled "METHOD AND SYSTEM FOR INTRODUCING NEW SERVICES INTO A NETWORK".

FIELD OF THE INVENTION

The invention relates generally to communication systems, and more particularly to a method for changing a communication path in a communication system.

BACKGROUND OF THE INVENTION

In current cellular communication systems, a mobile station communicates with a mobile switching center via a base station subsystem. The base station subsystem typically includes a base station controller that is coupled to a transcoder. The transcoder is coupled to the mobile switching center.

The mobile station may, at times, need to be handed over from its serving base station subsystem to a different target base station subsystem. In current systems, the target base station subsystem initiates the handover. If there is a problem with the signaling links between the base station controller and the mobile switching center, the call might be dropped. This is true even if the base station subsystems are capable of communicating with the mobile station. The potential for valid traffic channels with a loss of signaling is growing with the separation of traffic signals from control signals.

In certain cellular systems, the concept of keeping the handover within the base station subsystem solves a part of the problem, but not completely. The loss of the signaling links could still cause the call to drop, even if the original base station controller is no longer involved with the call. The call can be moved from one base station subsystem to another, but the call is not enabled from the base station subsystems, but rather from the core network.

In current packet networks that include a mesh that interconnects the base transceiver stations and the base station controllers, a means to request the transfer of the call from one unit to another would require standardization in order to manage traffic in the access network.

Connecting a base transceiver station to multiple base station controllers for redundancy to accommodate the failure of a base station controller solves the redundancy problem. However, existing calls would drop due to the inability to inform the mobile switching center that the calls are still up but have been moved to a different base station subsystem.

Thus, a need exists for a method and communication system for changing communication within a communication system without dropping the communication.

DETAILED DESCRIPTION OF A PREFERRED EMBODIMENT

The present invention provides a method for changing connection in a communication system. The communication system includes a base station subsystem and a mobile switching center. A communication is established between a mobile station and the mobile switching center. The communication travels to the mobile switching center via a first link that includes a first base station controller. If it is determined that the first link is no longer the preferred link, such as when the link goes down or is inoperable, the communication is changed to a second link. The second link is routed via a second base station controller located within the base station subsystem.

Figure 1:
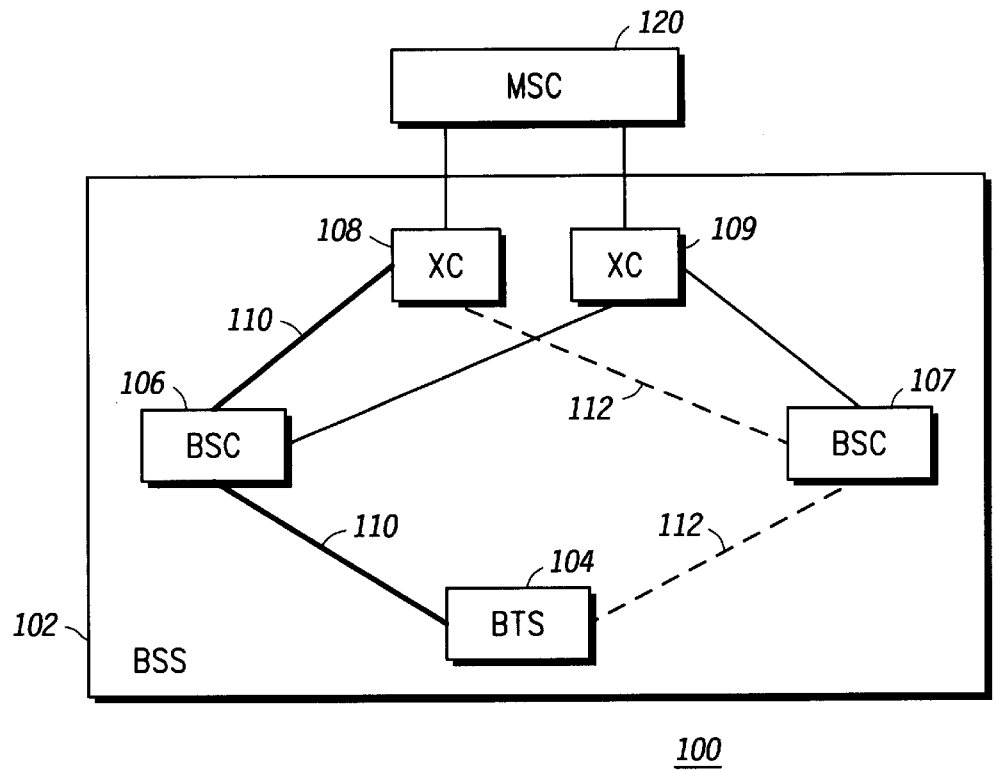
FIG. 1 depicts a communication system in accordance with the preferred embodiment of the present invention.
Figure 2:
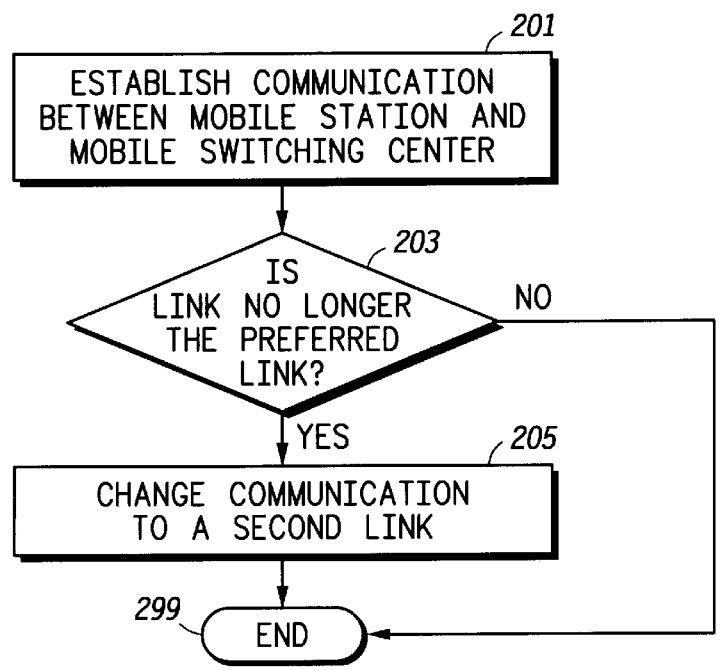
FIG. 2 depicts a flow chart depicting preferred operation of the present invention.

The present invention can be better understood with reference to FIGS. 1 and 2. Referring now to FIG. 1, a communication system 100 in accordance with the preferred embodiment of the present invention is depicted.

The following is a list of the acronyms used in FIG. 1:
BSS Base Station Subsystem
BSC Base Station Controller
BTS Base Transceiver Station
IP Internet Protocol
MSC Mobile Switching Center
XC Transcoder Communication system 100 is preferably a packet network utilizing an Internet Protocol (IP), but can alternately be any communication system that includes a base transceiver station in communication with multiple base station controllers. Communication system 100 can also include a hub or a common packet network.

Communication system 100 includes a base station subsystem (BSS) 102. In the preferred embodiment of the present invention, communication system 100 includes multiple base station subsystems coupled to MSC 120, but only one is depicted for clarity. In the embodiment including multiple BSSs, a link couples the two BSSs. Such a system preferably includes an inter-BSS link coupling the first base station subsystem and the second base station subsystem.

BSS 102 preferably includes base transceiver station (BTS) 104, first base station controller (BSC) 106, second base station controller 107, first transcoder 108, and second transcoder 109.

BTS 104 is connected to first BSC 106 and to second BSC 107. First BSC 106 is connected to first transcoder 108 and also to second transcoder 109. Second BSC 107 is connected to first transcoder 108 and also to second transcoder 109.

Transcoders 108 and 109 route information to and from BSCs 106 and 107. Transcoder 108 is connected to first BSC 106 and also to second BSC 107. First transcoder 108 is also connected to MSC 120. Second transcoder 109 is connected to first BSC 106 and second BSC 107, and is also connected to MSC 120. The information is routed to MSC 120 that provides switching functions for access to a PSTN or the like. In an alternate embodiment of the present invention, communication system 100 includes a common transcoder that is coupled to a first BSS and a second BSS.

BSS 102 is preferably coupled to mobile switching center (MSC) 120. BSS 102 communicates with a mobile station. The mobile station can be a mobile unit, a remote unit, a fixed wireless terminal, or any other unit capable of sending or receiving RF communications to or from BSS 102.

First link 110 includes first base station controller 106 and second link 112 includes second base station controller 107. Second link 112 provides an alternate path for traffic from BTS 104 to MSC 120 via second BSC 107.

FIG. 2 depicts a flowchart 200 depicting preferred operation of the present invention. Flowchart 200 details a method for changing connection in communication system 100. A communication is established (201) between mobile station and mobile switching center 120. Mobile station is preferably in communication with base station subsystem 102. The communication preferably travels to mobile switching center 120 via first link 110 that includes first base station controller 106. The system then determines (203) whether the first link 110 is no longer the preferred link. If the first link 110 is no longer the preferred link, such as when the link has gone down, the communication is changed (205) to the second link 112. Second link 112 includes second base station controller 107. This preferably appears to mobile switching center 120 that the mobile station has been handed off.

The present invention can also include the step of sending a handover complete message from second base station controller 107 to mobile switching center 120. The handover complete message alerts mobile switching center 120 that the communication has been switched from first base station controller 106 to second base station controller 107. This preferably entails rerouting the communication from first link 110 to second link 112. Alternately, the communication can be switched such that it is routed via BSC 107 and transcoder 109.

The present invention can also further include the step of alerting mobile switching center 120 that the communication has changed from first link 110 to second link 112. The step of alerting mobile switching center 120 is preferably accomplished by sending a handover complete message to mobile switching center 120. The step of alerting mobile switching center 120 is preferably accomplished after determining that first link 110 has gone down, or in other words, is currently inoperable. In an alternate embodiment of the present invention, the step of changing the communication to second link 112 is triggered by an improvement of the network connection, particularly in that of second link 112. Additionally, the link can be changed to improve traffic balancing.

It should also be understood that the communication can be changed to a third link, if it is determined that second link 112 goes down. This third link preferably comprises a third base station controller distinct from the first base station controller and the second base station controller.

The present invention therefore provides a method for changing communication in a communication system and the communication system therefor. The original communication is established within a BSS via a first link that goes through a first BSC and a first transcoder. When it is determined that the first link is no longer the preferred link, such as when the link has gone down, is inoperable, is too heavily loaded, or is no longer the optimal link, the communication is rerouted within the BSS to a second BSC via a second link. The second link is from the BTS to the second BSC and then to the first transcoder. In this manner, a communication can be changed and rerouted such that the communication is continued in adverse conditions. This will look like a handover to the MSC.

The present invention thereby aids end users and network operators in achieving higher levels of availability. Further, the present invention reduces the number of dropped calls due to network element outages.

While this invention has been described in terms of certain examples thereof, it is not intended that it be limited to the above description, but rather only to the extent set forth in the claims that follow.

What is claimed is:

1. A method for changing connection in a communication system, the communication system including a base station subsystem and a mobile switching center, the base station subsystem including a first base station controller connected to the mobile switching center, a second base station controller connected to the mobile switching center, and a base transceiver station connected to the first base station controller and the second base station controller, the method comprising the steps of:

receiving communication from a mobile station at the first base station;

establishing a communication between the mobile station and the mobile switching center, the mobile station in communication with a base station subsystem, the communication traveling to the mobile switching center via a first link between the first base station, the first base station controller, and the mobile switching center;

determining that a link between the first base station controller and the mobile switching center is no longer a preferred link; and changing the communication to a second link, the second link between the first base station, the second base station controller, and the mobile switching center.

2. The method for changing connection in a communication system in accordance with claim 1, further comprising the step of sending a handover complete message from the second base station controller to the mobile switching center, the handover complete message alerting the mobile switching center that the communication has been switched from the first base station controller to the second base station controller.

3. The method for changing connection in a communication system in accordance with claim 1, wherein it appears to the mobile switching center that the mobile station has been handed off.

4. The method for changing connection in a communication system in accordance with claim 1, further comprising the step of alerting the mobile switching center that the communication has changed from the first link to the second link.

5. The method for changing connection in a communication system in accordance with claim 4, further comprising the step of, prior to changing the communication to a second link, determining that the first link has gone down.

6. The method for changing connection in a communication system in accordance with claim 4, wherein the step of changing the communication to a second link is triggered by an improvement of the network connection.

7. The method for changing connection in a communication system in accordance with claim 6, further comprising the step of changing the communication to a third link.

8. The method for changing connection in a communication system in accordance with claim 7, wherein the third link comprises a third base station controller distinct from the first base station controller and the second base station controller.

9. The method for changing connection in a communication system in accordance with claim 4, wherein the step of alerting the mobile switching center that the communication has changed from the first link to the second link comprises sending a handover complete message to the mobile switching center.

10. A communication system for changing connection from a first link to a second link, the first link including a first base station controller and the second link including a second base station controller, the communication system comprising:

a mobile switching center;

a base station subsystem including a first transcoder connected to the mobile switching center, a second transcoder connected to the mobile switching center, the first base station controller connected to the first transcoder, the second base station controller connected to the second transcoder, and a base transceiver station connected to the first base station controller and the second base station controllers;

a second base station subsystem coupled to the mobile switching center;

a mobile switching center link coupling the first base station subsystem to the second base station subsystem; and a hub.

11. A communication system in accordance with claim 10, wherein the base station subsystem includes a first transcoder.

12. A communication system in accordance with claim 11, further comprising a second transcoder.

13. A communication system in accordance with claim 12, wherein the first base station controller is connected to the first transcoder and the second transcoder.

14. A communication system in accordance with claim 12, wherein the second base station controller is connected to the first transcoder and the second transcoder.

15. A communication system in accordance with claim 10, further comprising a common transcoder coupled to the first base station subsystem and the second base station subsystem.

16. A communication system in accordance with claim 10, further comprising an inter-BSS link coupling the first base station subsystem and the second base station subsystem.

17. A communication system in accordance with claim 10, further comprising a common packet network.

18. A communication system in accordance with claim 10, wherein the base transceiver station can communication with both the first base station controller and the second base station controller.

* * * * *

UNITED STATES PATENT AND TRADEMARK OFFICE
CERTIFICATE OF CORRECTION

PATENT NO.    : 6,192,037 B1
DATED         : February 20, 2001
INVENTOR(S)   : Spear Page 1 of 1

It is certified that error appears in the above-identified patent and that said Letters Patent is hereby corrected as shown below:

<u>Column 6,</u>
Line 5, reads "A"; should read -- The --
Line 8, reads "A"; should read -- The --
Line 10, reads "A"; should read -- The --
Line 13, read "A"; should read -- The --
Line 16, reads "A"; should read -- The --
Line 20, reads "A"; should read -- The --
Line 23, reads "A"; should read -- The --
Line 25, reads "A"; should read -- The --
Line 21, reads "inter-BSS", should read -- inter - base station subsystem --
Line 26, reads "communication", should read -- communicate --

Signed and Sealed this

Fourth Day of September, 2001

*Attest:*

*Attesting Officer*

NICHOLAS P. GODICI
*Acting Director of the United States Patent and Trademark Office*